Figure 16:
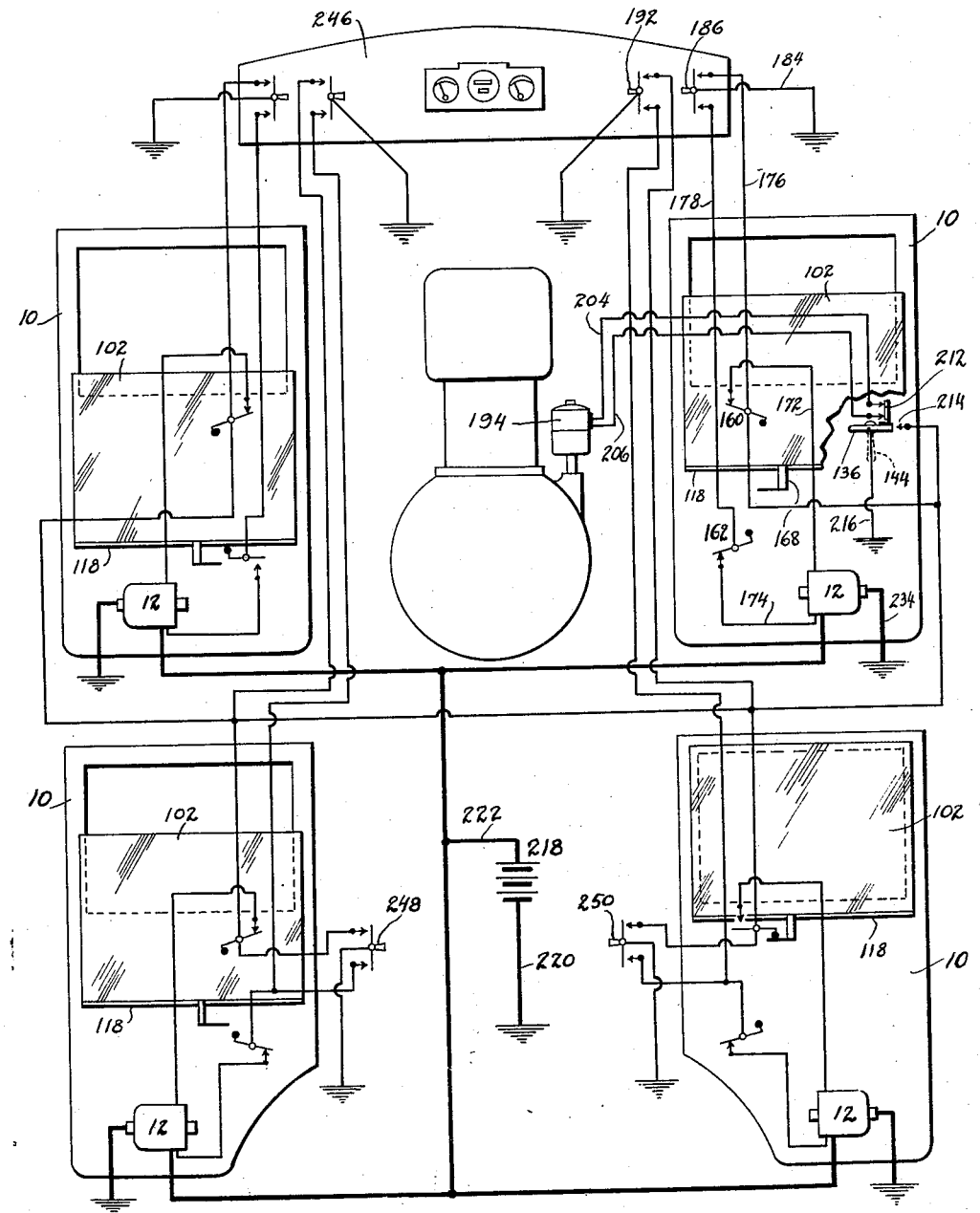

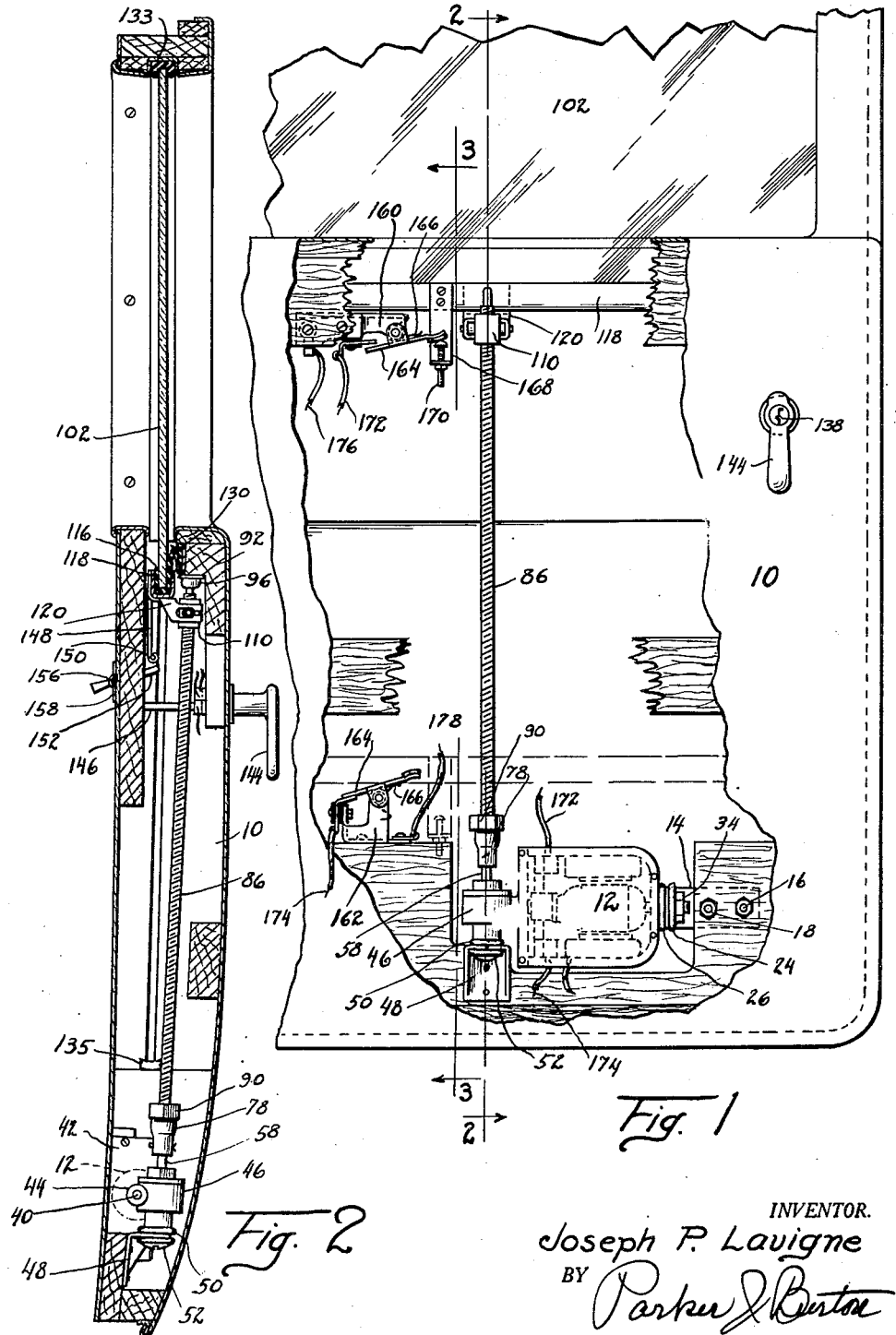

July 19, 1938.  J. P. LAVIGNE  2,124,037
VEHICLE WINDOW CONTROL MECHANISM
Filed Jan. 12, 1931  5 Sheets-Sheet 2
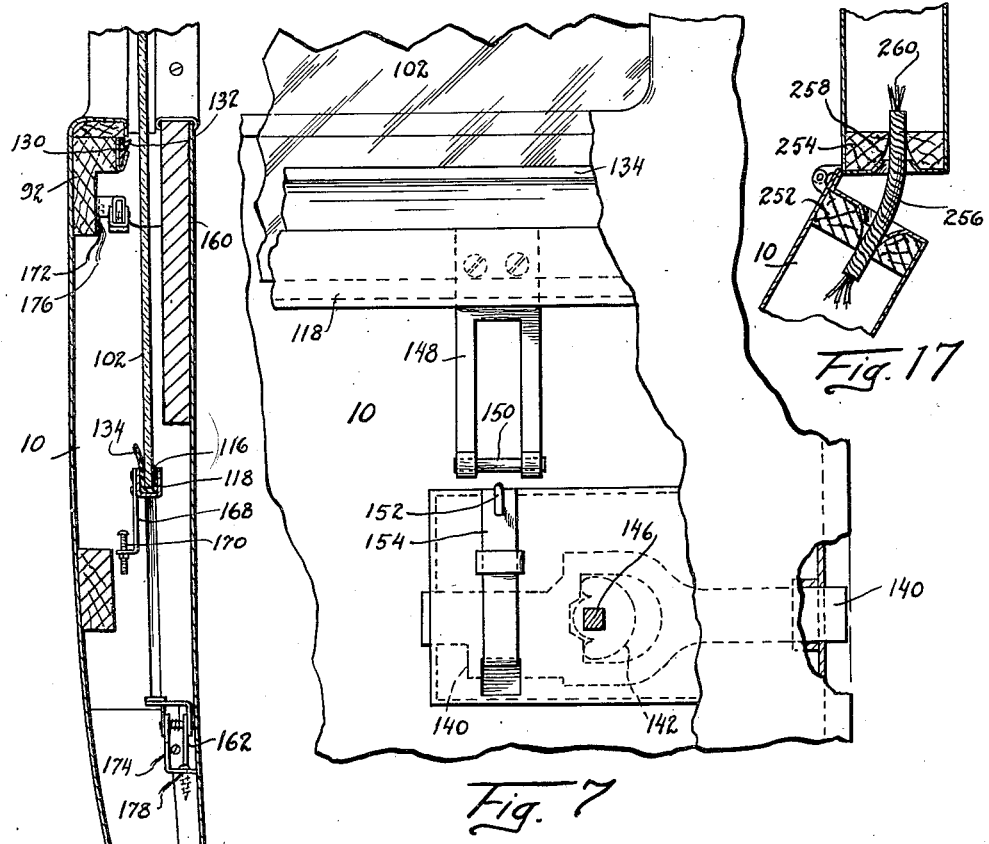
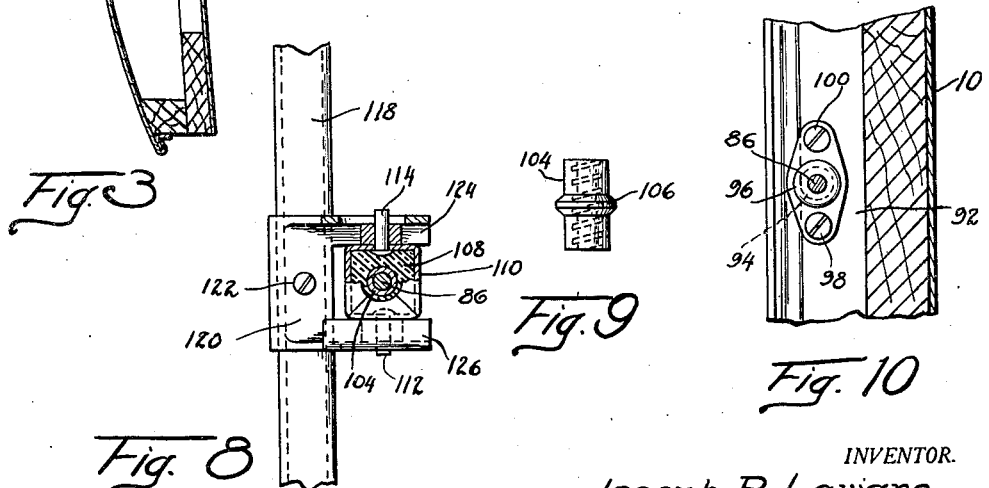
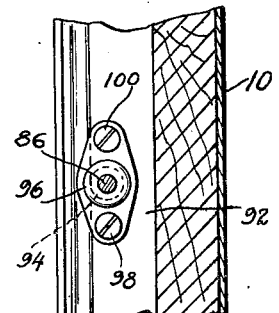
INVENTOR.
Joseph P. Lavigne
BY
ATTORNEYS July 19, 1938.  J. P. LAVIGNE  2,124,037
VEHICLE WINDOW CONTROL MECHANISM
Filed Jan. 12, 1931   5 Sheets-Sheet 3
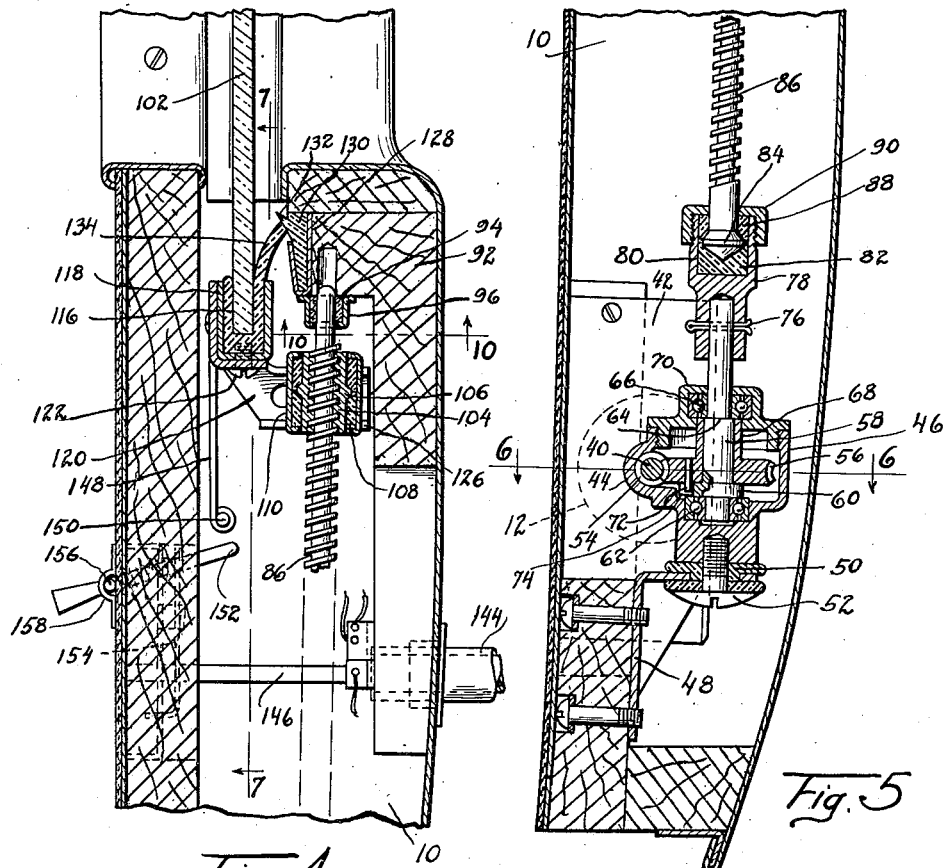
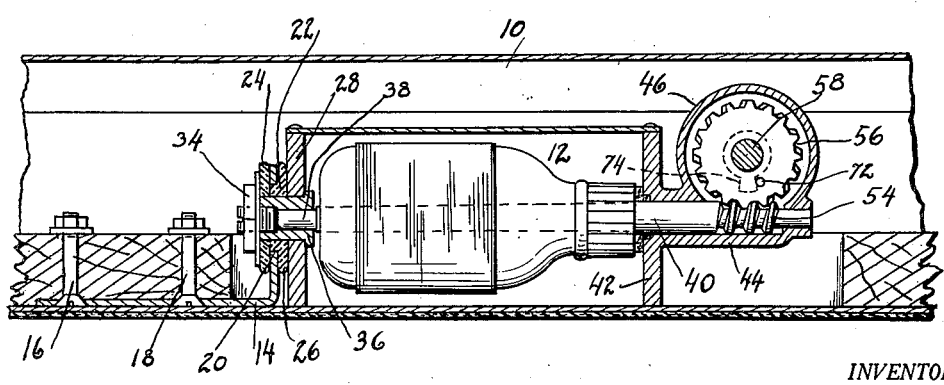
INVENTOR.
Joseph P. Lavigne
BY
ATTORNEYS.

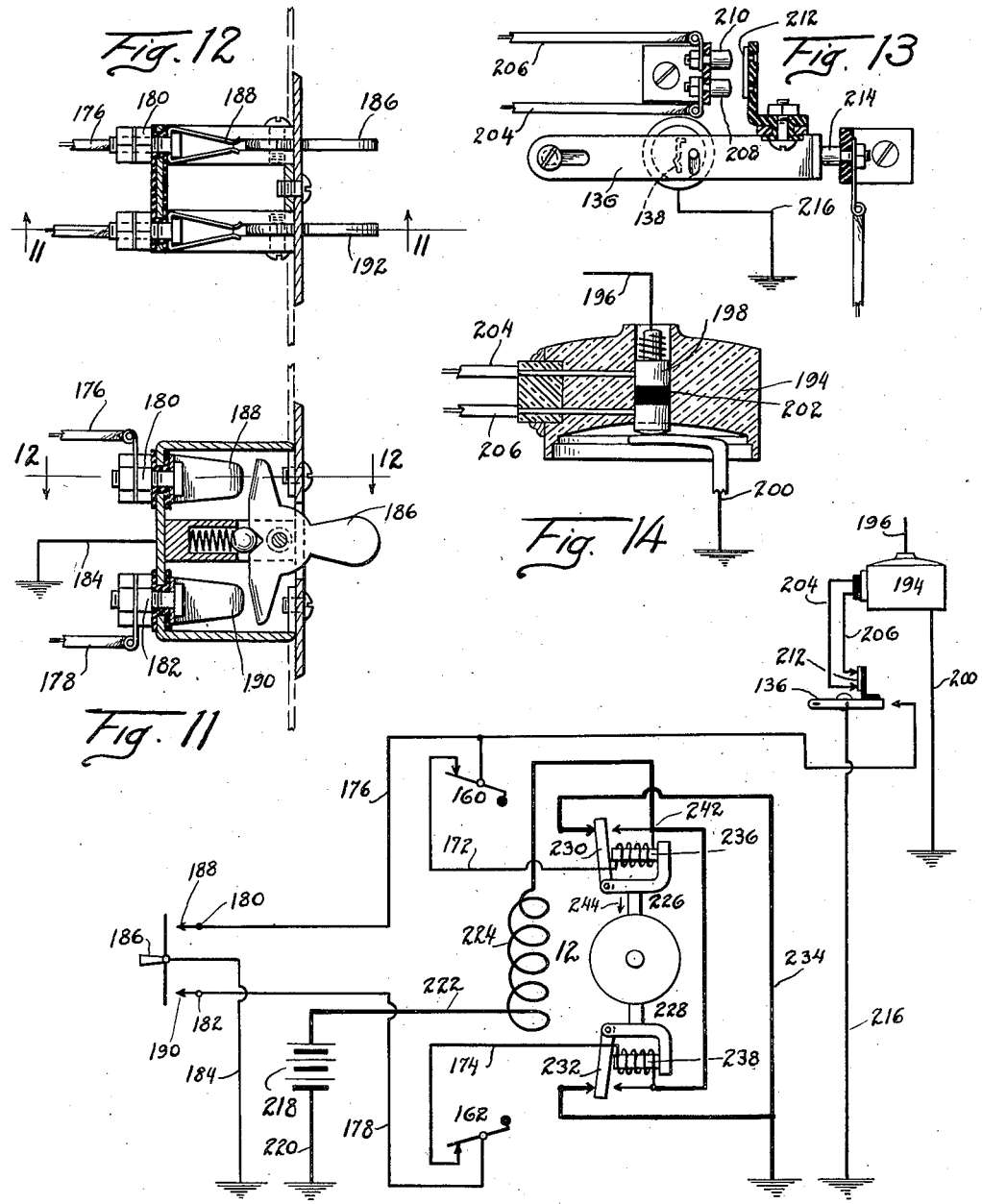

Patented July 19, 1938

2,124,037

UNITED STATES PATENT OFFICE 2,124,037

VEHICLE WINDOW CONTROL MECHANISM

Joseph P. Lavigne, Detroit, Mich.

Application January 12, 1931, Serial No. 508,083

7 Claims. (Cl. 180—82)

My invention relates to automotive vehicles and has particular reference to the closed body vehicle type.

One object of my invention is to eliminate the necessity of manual effort in raising and lowering the window panes. Hitherto it has been customary to provide small rotatable cranks which may be rotated to raise or lower the window panes, the gearing provided being such that a large number of rotations was necessary to fully raise or lower them. In eliminating this need for utilizing a substantial manual effort I propose to associate independently operable power means with each window pane which is adapted to be raised and lowered. Control means are provided in the interior of the body for energizing each of the power means independently.

A further object of my invention is to provide a safety factor against human neglect by so arranging the aforesaid power units that they are automatically operable to raise all of the window panes upon locking the key door of the vehicle. The use of a closed car is a substantial factor in the prevention of theft of articles left in the car. On the conventional closed body provided with four doors it is customary to provide three of the doors with manually manipulable locking mechanism on the interior thereof whereby the latch on each of the doors will be automatically locked upon closing of the door. The fourth door is provided with a bolt operated by the turning of the key and it is only necessary to lock this one door with a key in order to prevent the opening of any door in the car. There is always the danger, however, that the windows will be forgotten and the car will be left with some of them lowered to such an extent that articles may be removed from the interior of the car, or the door opened by reaching through the lowered window. I proposed to so arrange the power mechanism for raising and lowering my windows that each of them is automatically operable to raise the window with which it is associated upon locking the door with a key.

For the purpose of further insuring against the possible neglect of the car owner to properly close and lock his car, I also provide means associated with each respective latch locking mechanism and window pane whereby the raising of the said window pane automatically locks the latch of the door. The door in each instance may be unlocked from the interior of the car if desired.

Still a further object of my invention is to associate the ignition mechanism for the combustion engine with the locking means for the car in such a way that the ignition circuit will automatically be thrown open upon locking the door provided with the key lock. There would be no particular advantage in such an arrangement if locking of the door comprised the only means for opening and closing the ignition circuit, but my particular arrangement interferes in no way with the functioning of the conventional ignition switch to open and close the circuit.

Yet another object of my invention is to so mount the power means for raising and lowering the window panes associated with each door that they will be firmly positioned inside each door and will not readily develop rattles or noises of any kind due to constant opening and closing of the door. I contemplate the provision of cushion supports for this purpose, the yieldability of which will also serve to insure long life to the power units themselves. Each of these power units, which I have illustrated as an electric motor adapted to be run from the conventional storage battery provided on the car, is coupled with a window pane in such way that positive, rapid raising and lowering thereof is assured. My novel coupling also insures against the binding of any part in such way as to interfere with the efficient operation of the mechanism.

While I have illustrated the power means in conjunction with the panes in the doors, it is to be understood that the inventive concept includes this means of raising or lowering any window, the door windows in particular having beeen shown to illustrate the combination of the latch locking mechanism therewith.

Various other objects and meritorious features of my invention will be apparent from the following description taken in conjunction with the drawings wherein like numerals refer to like parts throughout the several figures and wherein:

Fig. 1 is an elevation, partly broken away, of the power unit mounted in the key lock door, Fig. 2 is a section along 2—2 of Fig. 1, Fig. 3 is a section along 3—3 of Fig. 1, Fig. 4 is a transverse section through the door illustrating the coupling between the power unit and the window pane, Fig. 5 is a transverse section through the lower portion of a door illustrating the driving coupling from the power unit, Fig. 6 is a section along 6—6 of Fig. 5, Fig. 7 is a side elevation, partly broken away, illustrating the automatic latch locking mechanism associated with each door and its respective window pane, Fig. 8 is a bottom plane, partly broken away and in section, of the coupling between window pane and power unit, Fig. 9 is a detail of the window pane actuating member, Fig. 10 is a section through 10—10 of Fig. 4, Fig. 11 is a transverse section of one of my selective power unit controls located on the interior of the car, on line 11—11 of Fig. 12, Fig. 12 is a section taken on 12—12 of Fig. 11, Fig. 13 illustrates the switch mechanism associated with the key lock in one of the doors, Fig. 14 illustrates my improved distributor head structure for automatically breaking the ignition circuit upon locking of the key lock door, Fig. 15 is a diagrammatic illustration of the circuits associated with the key lock door assembly including the ignition circuit breaker, and Fig. 16 is a diagrammatic illustration of the circuits involved in my improved mechanism as a whole, and Fig. 17 illustrates the manner in which cables may be extended into the interior vehicle body door.

While it is quite possible to utilize various types of power units for the purpose of raising and lowering the window panes, electric means are preferable because they can be so readily associated with circuits of various kinds to automatically accomplish a diversity of operations. Any electric power unit may be utilized to advantage, but for purposes of illustration I have shown mounted in the interior of the door 10 a reversible electric motor 12. To eliminate transmission of vibration and jar to the motor, as well as the development of rattles, etc., I have used yieldable cushioning material as a mounting for the motor. The bracket 14 is firmly positioned within the door, as by means of the bolts 16 and 18 and is provided with an opening 20 in which is seated a bushing 22, of rubber or some such cushioning material. This bushing is provided, as illustrated, with a peripheral groove around its outside edge which is adapted to seat against the inner edge of opening 20, the extended side flange portions 24 and 26 constituting a yielding abutment one side of which seats firmly against the end wall of the motor housing 28 and the other side of which is pressed firmly thereagainst by a lock nut 34 threaded into flanged bushing 36. The bushing 36 is provided with an axial opening which constitutes a bearing for one extremity 38 of rotatable armature shaft 40 of motor 12. The opposite end wall 42 of the motor housing is provided with an elongated tubular extension 44 which constitutes a bearing for the opposite end of the armature shaft. As illustrated, the motor is mounted substantially in a horizontal plane extending across the width of the door 10 and inside the same.

Integral with the extended portion 44 of bracket 42 is a housing 46, which housing is supported by means of the bracket 48, cushion bushing 50, and nut 52 in substantially the same manner as the bearing bushing 36.

The extremity of armature shaft 40 is threaded as at 54 to constitute a worm drive which is adapted to mesh with pinion 56 rotatably journalled within the housing 46. This pinion is rotatably mounted upon the shaft 58, which shaft is shouldered as at 60 and supported upon bearings 62 mounted within the base of the housing 46. Shaft 58 is provided with a second shoulder 64 which supports roller bearing 66 in conjunction with the upper extremity of the sleeve portion 68 of pinion 56. Closure member 70 is threaded into the upper portion of housing 46 and, being provided with an aperture through which the shaft 58 may extend, positions the assembly as clearly illustrated in Fig. 5.

Pinion 56 is provided with a depending pin 72 fixedly secured therein and adapted to engage a projecting lug 74 extending radially outwardly from the shoulder portion 60 of shaft 58. Engagement of the pin 72 with the lug 74 causes rotation of the shaft 58 and due to the gear ratio between the worm 54 and its pinion 56 the motor is free to rotate a substantial number of turns prior to forming a driving engagement between the pin and the lug. In this way the motor may gather a sufficient amount of momentum to adequately handle the load which is placed upon the driven shaft 58.

Secured to the upper extremity of shaft 58, as by means of the cotter pin 76 is a coupling element 78 which is provided with a pocket 80. A yieldable cushioning element 82 is seated in the bottom of this pocket and in that is seated the enlarged headed extremity 84 of the threaded drive shaft 86. A similar yieldable cushion element 88 is positioned over the upper portion of enlarged head 84 and the two cushion elements 82 and 88 are firmly clamped together by means of a closure member 90 which is adapted to screw down over the upper extremity of element 78. In this way a firm driving connection from the motor 12 to the threaded shaft 86 is secured, at the same time providing a yielding connection having a certain amount of inherent resiliency therein by reason of the cushion elements 82 and 88.

The upper extremity of the threaded drive shaft 86 (see Fig. 4) is journalled in door frame member 92 and provided with a cushion seat 94 which may be impregnated with lubricant and which is held in place by means of a cap 96 secured to the underside of frame member 92 as by the screws 98 and 100. The aperture in cap 96 is of larger diameter than shaft 86, thus preventing metal to metal contact.

For the purpose of coupling the shaft 86 with the window pane 102 to raise and lower the latter I have provided a runner 104 which is adapted to slide longitudinally along the shaft 86 as the latter is rotated by motor 12. This runner is preferably of the self lubricating type and is provided with a protruding collar portion 106 intermediate its ends which functions to firmly position it within a split cushion unit 108 which is firmly secured thereabout by means of a clamping cage element 110. Upon each side of the cage 110 there is an aperture which permits the extension therethrough of pins 112 and 114, which pins are provided with heads which are held firmly against the split cushion element 108 on the inside of the cage. In this way the development of rattle of the pins is prevented and a firm connection between the pins and the runner 106 is secured.

A channel unit 116, of rubber or some cushioning material, is secured along the lower edge of the window pane 102 as by means of the clamping channel 118. A drive bracket 120 is secured to the bottom edge of window pane 102 as by means of a screw 122 which extends through both the clamping element 118 and the cushion channel 116. This drive bracket is provided with two laterally extending arms 124 and 126, each of which is provided with a slot 121 in which the pins 114 and 112 respectively are adapted to seat.

It will, therefore, be apparent that longitudinal movement of the runner 104 along the shaft 86 as the latter rotates will result in raising or lowering of the window pane 102. It will also be seen that the couplings straight through from the driving motor 12 to the window pane 102 itself are of a yieldable, cushioning nature whereby rattle is eliminated and excessive strain to the parts by virtue of vibration and jarring action is substantially eliminated. Since bracket 120 is free to slide upon pins 112 and 114 it will not matter that the space available within the door necessitates a non-parallel relation between shaft 86 and the guide channel in which the pane is adapted to travel (see Fig. 2).

Secured within a channeled bracket 128 which extends along the inside of door frame 92 across the upper portion thereof is a cushion member 130 having a protruding ledge portion 132. One wall 134 of the cushion channel 116 extends upwardly and outwardly as indicated clearly in Fig. 4 in such a way that it will contact the protruding portion 132 as the window pane reaches its uppermost extremity and cushion the actual closing of the window pane. Rubber channels 133 and 135 at each extremity of the pane movement constitute respectively cushions limiting the movement of the driven member, the drive member being cushioned by the bushing 50. This complete cushion effect at each point where shock occurs (clearly seen in Fig. 2) eliminates noisy operation of the panes and transmission of shock to any of the parts.

All doors are provided with the automatic latch locking mechanism illustrated particularly in Fig. 7, one door being provided with means operable from the exterior of the car for releasing the latch. In Fig. 13 I have illustrated a conventional mechanism for locking the door latch from the exterior, the illustration being somewhat diagrammatic. The bolt 136 is arranged to slide upon exterior manipulation of the key in keyhole 138 to lock the latch element 140 (see Fig. 7). All the latches may be actuated in any desired manner, as by means of the cam 142 which is actuated by the door handles 144 through the medium of the squared shaft 146. To the channel clamp 118 which extends along the lower edge of each window pane 102 is secured a depending spring cam element 148.

When the window pane is lowered the camming surface 150 of element 148 is adapted to contact the inner extremity of a manually manipulable member 152. This member extends through a slot in the bolt 136 and is pivoted as at 156 to a bracket 158 secured to the interior of the vehicle body. Therefore, opening of the window in any one of these doors automatically releases the door latch if it were locked by bolt 136. Also, one latch may be released from the exterior by sliding bolt 136 with the key. As indicated in Fig. 4 this element may be manually manipulated from the interior of the car to slide the bolt 136 for the purpose of locking or releasing the latch 140. The reverse operation occurs when the window is closed and the camming surface 150 passes over the actuating member 152. It will be apparent that the latch is automatically locked in this way by the closing of the window.

Normally closed switches are associated with each of the windows for automatically controlling the opening of the circuit through the motor as the pane approaches its fully raised or lowered position. The switches have been illustrated in some detail in Fig. 1, there being an upper switch 160 secured to the door frame and a lower switch 162 secured to a portion of the lower door frame. Each switch includes a pivoted contact element 164 which is normally held by means of hair spring 166 in position to complete a circuit through the switch. A depending bracket 168 is secured to the channel clamp 118 which extends along the lower edge of each window pane, each bracket being provided with a foot through which a screw 170 may be adjustably positioned. As clearly illustrated in Fig. 1, this screw is adapted to contact the arm of contact element 164 as the window pane approaches its uppermost position and break the contact. The contact arm 164 of the lower switch 162 is so positioned that its contact is broken by the bottom of channel clamp 118 as the window pane approaches its lowermost position. This is clearly illustrated by the dotted line position indicated in the lower portion of Fig. 1. Upper switch 160 connects with lead wire 172 extending to the motor 12 and lower switch 162 connects with lead wire 174 likewise extending to the motor 12. The manner in which these leads are connected to the motor shall be more clearly brought out hereinafter. A second lead wire 176 and 178 respectively is connected to each of the switches, each of these leads extending to a contact 180 and 182 respectively on the manually operable control switch illustrated in Fig. 11.

Each of these switches is designed to control one particular motor for the purpose of raising or lowering at will any desired window pane. Each one is a single pole double throw affair of any desired construction, the switch being grounded upon any desired portion of the frame or body by the lead 184 (see Fig. 11). The particular structure of the switch is unimportant and for that reason its details will not be enlarged upon herein. Suffice to say that the switch normally remains in the position indicated in Fig. 11 where neither circuit is complete, the operator raising or lowering the handle 186 to make the contact 188 or 190 according as to whether he wishes to lower or raise the window. Fig. 12 simply illustrates one manner in which a plurality of these switches may be mounted in pairs to control, respectively, let us say, the rear right and left windows, or the front right and left windows. Referring specifically to Fig. 12 we shall assume that the handles 186 and 192 control right front and rear windows respectively. The circuits controlling the operation of the motors to raise or lower the windows will be more clearly described hereinafter.

For the purpose of including an automatic ignition lock operable to break the circuit through the ignition upon locking the door by means of the key I have devised an improved distributor head 194. This head is clearly illustrated in Fig. 14 and includes a lead 196 from the coil to stud 198 which is maintained in contact with the lead 200 which is grounded conveniently. Customarily the ignition switch on the dash of the vehicle closes a circuit through the head to the ground. I have modified the conventional structure by including a section 202 of insulation material intermediate the extremities of stud 198. The lead wires 204 and 206 extend from contacts 208 and 210 respectively, (see Fig. 13) and are connected with the conducting extremities of the stud 198. When the key is manipulated to draw the bolt 136 for the purpose of locking the door latch the insulated contact element 212 which is adapted to bridge contacts 208 and 210 is withdrawn to the position indicated in Fig. 13. Thus the circuit is automatically broken through the distributor head 194. The same movement of locking bolt 136 makes contact with contact element 214 to close whatever windows may be lowered at the time. The manner in which this is accomplished will be brought out more clearly hereinafter. The bolt is grounded conveniently through lead 216.

I contemplate utilizing a reversible motor wherein the direction of current flow through the field is constant and the direction of flow through the armature coils is reversed for the purpose of reversing the direction of rotation of the motor. This structure is clearly brought out in the diagrammatic illustration of Fig. 15 wherein the battery 218 is grounded through lead 220 from one pole and connected from the other by lead 222 to the field coil 224 of the motor. The brush elements of the motor, diagrammatically illustrated in Fig. 15 and represented by the numerals 226 and 228, include pivoted arms 230 and 232 respectively which are normally maintained in contact with a connection to the ground lead 234. In association with the brushes and in operative relation to the arms 230 and 232 are small electro-magnets 236 and 238 respectively, the current for the coils of which is provided through shunt circuits controlled by the switches 160 and 162. It is the position of the arms 230 and 232 which control the direction of the current flowing through the armature coils of the motor, the position of these arms being determined by energization of the electro-magnets respectively.

As has been hitherto stated, switches 160 and 162 are adapted to remain closed except when the window pane is in either extreme position. Assuming that the right front window, 240 in Fig. 16, is in the position indicated therein, the switches 160 and 162 will be in the closed position indicated in Fig. 15. Assuming that the operator desires to close the window from the inside he will manipulate the switch 186, upwardly in the circuit of Fig. 15 to close the contact 188. The circuit will then proceed from the battery 218, through coil 224, to the shunt point 242. At this point a small portion of the current will go through the coils of electromagnet 236 to draw the pivoted arm 230 toward the right, thus completing a circuit from shunt point 242 through the arm 230, the brush 226, through the armature coils in the direction of the arrow 244, through the brush 228 on the opposite side, outward along the pivoted arm 232 which has remained in the position indicated in Fig. 15, and thence to the ground 234. The shunt circuit through the electromagnet 236 has proceeded through the closed upper switch 160, through the lead 176 to contact 188 and thence across to ground 184. The current can not flow from shunt point 242 to the electromagnet 238 because the contact 190 is open and can not flow through the armature coils in the opposite direction because the said magnet 238 has not been energized to draw pivoted arm 232 to the right to complete the circuit in that direction. As the window approaches its uppermost limit the upper switch 160 is opened by means of the screw 170, the circuit is consequently broken, and the momentum of the revolving motor serves to complete the closing of the window pane.

Assuming that the operator desires to lower any particular window from the interior he has only to depress switch blade 186 to make contact with the lead contact 190. The circuit is then reversed through the armature coils, extending in a direction opposite to that indicated by the arrow 244. In this instance the arm 232 of magnet 238 will be drawn to the right and the arm 230 will remain in the position indicated in the Fig. 15. In each instance the main circuit is grounded at 234 and the shunt circuit energizing the electromagnet at ground 184.

As clearly indicated in Fig. 16 a plurality of switches like that indicated in Fig. 11 may be arranged upon the dash board 246, and a similar switch may be installed in the rear tonneau whereby occupants of the rear seat may control the raising and lowering of the rear windows independently of the switches on the dashboard. Such switches have been indicated diagrammatically in Fig. 16 by the numerals 248 and 250.

As stated in the objects of my invention the primary desideratum of the structure is to automatically raise the windows when the key is utilized to lock the control key door. This locking manipulation, as already stated, causes the bolt 136 to make contact at 214 (see Fig. 13) thus closing a circuit through all the motors in the direction which functions to raise the windows. This circuit may be readily followed from Fig. 15. It may be best explained by stating that the ground 216 is substituted for the ground 184 which latter ground completes the circuit when switch 186 is raised to make contact with 188, and the circuit is precisely the same otherwise as the circuit heretofore explained in conjunction with the raising of switch 186. As already explained likewise, the contact 212 is withdrawn and the circuit through the distributor head 194 is automatically broken.

In Fig. 16 circuits are illustrated which are duplicates of the circuit shown in detail in Fig. 15, a circuit extending to each door and motor assembly as indicated, the main leads all extending from the battery 218, the windows where indicated in various positions, it having been already explained that each upper switch 160 remains closed but automatically opens to break the circuit at the end of the closing movement of each window. Each lower switch 162 opens to break the circuit in the opening direction, the circuit in each instance being broken somewhat ahead of the extreme movement of the window to permit momentum to complete the movement.

For the purpose of passing any necessary lead wires into the door structure I have devised the structure illustrated in Fig. 17, wherein the corner posts 252 and 254 of the door 10 and body respectively are apertured to receive a flexible cable 256. The outer extremity of the aperture in post 254, which remains stationary, is flared out as indicated at 258 to substantially eliminate bending strain on cable 256 when door 10 swings outwardly as indicated. Any number of lead wires 260 may be passed through the cable into the interior of door 10.

Various modified forms of my basic concept will be apparent and I intend to limit myself only within the scope of the appended claims.

What I claim is:

1. In combination with an automotive vehicle body having a plurality of doors, a movable window pane in each door, power means in each door operable to raise and lower the panes, a lock on each door, means for actuating each of said locks interiorly of the body, means associated with one of said locks for actuating it exteriorly of the body, and means associated with said last means for automatically energizing each power means associated with an open pane to close the same.

2. In combination with an automotive vehicle including a closed body having a plurality of doors provided with latches and movable window panes, a motor provided with an ignition circuit, independently operable power means associated with each of said doors for raising or lowering the panes, means operable exteriorly of the body for locking one of said door latches including mechanism responsive thereto adapted to automatically energize said power means to close all lowered windows and break the ignition circuit.

3. In combination with a vehicle door having a slidable glass pane associated therewith, means for raising and lowering said pane, latch mechanism associated with said door, means for locking said latch mechanism, means operable automatically upon closing movement of said pane to actuate said locking means, and means operable from each side of said door associated with said locking means for actuating the same independently of one another and independently of movement of said pane.

4. The combination of a vehicle door including a slidable glass pane and latch mechanism, power means positioned within the door coupled with said pane for opening and closing the same, means manually operable from one side of said door for locking said latch mechanism and releasing the same, and means actuated by said pane operable to actuate said locking mechanism on closing movement of the pane.

5. The combination of a vehicle body having a plurality of doors, a slidable transparency associated with each door, power means positioned within each door and coupled with said transparency for opening or closing the same, latch mechanism associated with each door, means associated with each latch mechanism for locking the same, actuating mechanism operable from the exterior of one of said doors coupled with its respective locking means, and means operable upon locking movement of the latter for energizing each of said power means to close its respective transparency if open.

6. The combination of a vehicle body having a plurality of doors, a slidable transparency associated with each door, power means positioned within each door and coupled with said transparency for opening or closing the same, latch mechanism associated with each door, means associated with each latch mechanism for locking the same, actuating mechanism operable from the exterior of one of said doors coupled with its respective locking means, means operable upon locking movement of the latter for energizing each of said power means to close its respective transparency if open, and means associated with each of the other transparencies for automatically actuating its respective latch locking means on closing movement.

7. In combination with a vehicle having a plurality of doors, slidable transparencies associated with each door, power means coupled with said transparencies for closing and opening the same, latch mechanism associated with each door, means automatically responsive to closing movement of each transparency for locking the latch of its respective door, ignition mechanism including a circuit, means operable from the exterior of one of said doors for locking its latch mechanism, said means including means automatically responsive to exterior manipulation of said locking mechanism to energize said power means to close said transparencies and break the ignition circuit.

JOSEPH P. LAVIGNE.